United States Patent
Varadaraj et al.

(10) Patent No.: US 7,132,180 B2
(45) Date of Patent: Nov. 7, 2006

(54) ALKYL SORBITAN EMULSION COMPOSITIONS FOR FUEL CELL REFORMER START-UP

(75) Inventors: Ramesh Varadaraj, Flemington, NJ (US); Paul Joseph Berlowitz, Glen Gardner, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 497 days.

(21) Appl. No.: 10/324,208

(22) Filed: Dec. 20, 2002

(65) Prior Publication Data

US 2003/0165721 A1  Sep. 4, 2003

Related U.S. Application Data

(60) Provisional application No. 60/352,022, filed on Jan. 25, 2002.

(51) Int. Cl.
*H01M 8/04* (2006.01)
*H01M 8/00* (2006.01)

(52) U.S. Cl. .......................................... 429/13; 429/17
(58) Field of Classification Search .................. 429/13, 429/17
See application file for complete search history.

(56) References Cited

U.S. PATENT DOCUMENTS

| 3,615,290 | A | | 10/1971 | Nixon ............................ 44/51 |
| 4,477,258 | A | * | 10/1984 | Lepain ......................... 44/302 |
| 6,353,034 | B1 | | 3/2002 | Amairie et al. ................ 516/72 |
| 6,492,322 | B1 | * | 12/2002 | Cooper et al. ............... 510/516 |
| 6,786,940 | B1 | * | 9/2004 | Wenderoth et al. ........... 44/399 |
| 6,890,672 | B1 | * | 5/2005 | Dickman et al. .............. 429/19 |

* cited by examiner

*Primary Examiner*—Dah-Wei Yuan
(74) *Attorney, Agent, or Firm*—Ramesh Varadaraj; Paul E. Purwin

(57) ABSTRACT

The present invention relates to emulsion compositions for starting a reformer of a fuel cell system. In particular, the invention includes emulsion compositions comprising hydrocarbon fuel, water and alkyl sorbitan surfactants for starting a reformer of a fuel cell system.

6 Claims, 2 Drawing Sheets

FIGURE 1: CONVENTIONAL SYSTEM WITH NON-EMULSIFIED FUEL

ALKYL SORBITAN EMULSION COMPOSITIONS FOR FUEL CELL REFORMER START-UP

CROSS-REFERENCE TO RELATED APPLICATION

This application claims the benefit of U.S. Provisional Application 60/352,022 filed Jan. 25, 2002.

BACKGROUND OF INVENTION

The present invention relates to compositions for use at start-up a reformer of a fuel cell system. In particular, this invention includes emulsion compositions comprising hydrocarbon fuel, water and surfactant for use at start-up of a reformer of a fuel cell system.

Fuel cell systems employing a partial oxidation, steam reformer or autothermal reformer or combinations thereof to generate hydrogen from a hydro-carbon need to have water present at all times to serve as a reactant for reforming, water-gas shift, and fuel cell stack humidification. Since water is one product of a fuel cell stack, during normal warmed-up operation, water generated from the fuel cell stack may be recycled to the reformer. For start-up of the reformer it is preferable that liquid water be well mixed with the hydrocarbon fuel and fed to the reformer as an emulsion. The current invention provides emulsion compositions suitable for use at start-up of a reformer of a fuel cell system.

SUMMARY OF THE INVENTION

One embodiment of the invention provides emulsion compositions suitable for use at start-up of a reformer of a fuel cell system comprising hydrocarbon, water and surfactant.

In a preferred embodiment, the emulsion composition is a bicontinuous emulsion comprising a coexisting mixture of at least 80 vol % of a water-in-hydrocarbon macro-emulsion and from 1 to 20 vol % of hydrocarbon-in-water micro-emulsion.

In another embodiment of the invention is provided a method to prepare a bicontinuous emulsion comprising a coexisting mixture of at least 80 vol % of a water-in-hydrocarbon macro-emulsion and from 1 to 20 vol % of hydrocarbon-in-water micro-emulsion comprising mixing hydrocarbon, water and surfactant at low shear.

In yet another embodiment is a bicontinuous emulsion composition comprising a coexisting mixture of at least 80 vol % of a water-in-hydrocarbon macro emulsion and from 1 to 20 vol % of a hydrocarbon-in-water micro emulsion.

DETAILED DESCRIPTION OF THE PREFERRED EMBODIMENTS

The emulsion compositions of the present invention can be used for start-up of a reformer of a fuel cell system. In a preferred embodiment the emulsion compositions can be used for start-up of a reformer of an improved fuel cell system described hereinafter. The improved fuel cell system comprises a convention fuel cell system to which a start-up system is operably connected. A conventional fuel cell system and the improved fuel cell system are described below.

Figure 1:
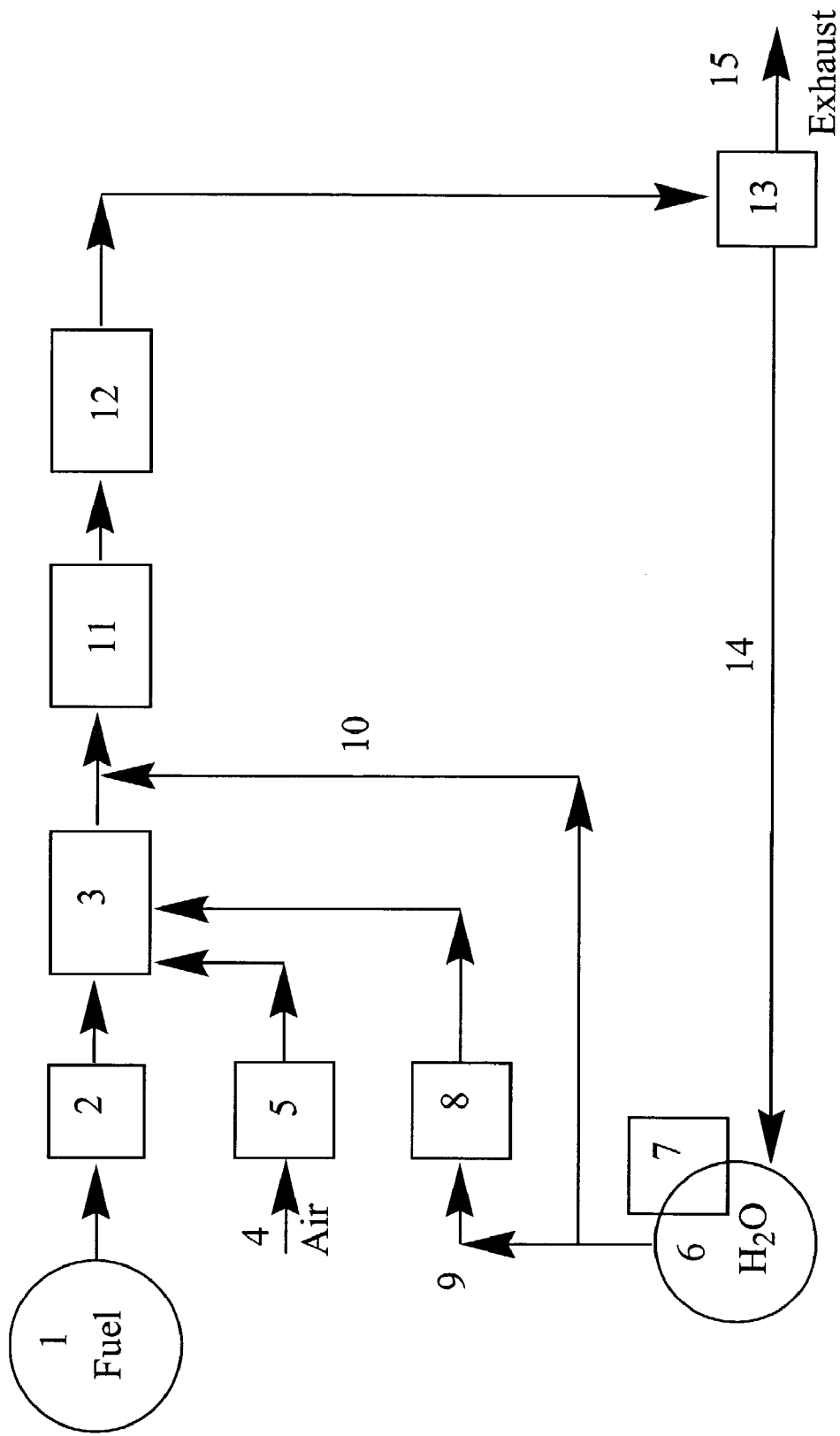
FIG. 1 shows a schematic diagram of a typical prior art conventional fuel cell system.

A conventional fuel cell system comprises a source of fuel, a source of water, a source of air, a reformer, a water gas shift reactor, reactors for converting CO to $CO_2$ and a fuel cell stack. A plurality of fuel cells operably connected to each other is referred to as a fuel cell stack. FIG. 1 shows a schematic of one embodiment of a prior art hydrogen generator based on a hydrocarbon liquid fuel and using partial oxidation/steam reforming to convert the fuel into a syngas mixture. This system design is similar to that being developed by A. D. Little, except for the allowance of feeding water to the reformer to practice autothermal reforming (Ref.: J. Bentley, B. M. Barnett and S. Hynke, 1992 Fuel Cell Seminar—Ext. Abs., 456, 1992). The process in FIG. 1 is comprised as follows: Fuel is stored in a fuel tank (1). Fuel is fed as needed through a preheater (2) prior to entering the reformer (3). Air is fed to the reformer (5) after it is heated by the preheater (5). Water is stored in a reservoir tank (6). A heat exchanger (7) is integral with a portion of the water tank (6) and can be used to melt portions of the water if it should freeze at low operation temperatures. Some water from tank (6) is fed via stream (9) to preheater (8) prior to entering the reformer (3). The reformed syngas product is combined with additional water from tank (6) via stream (10). This humidified syngas mixture is then fed to reactors (11) which perform water gas shift (reaction of CO and water to produce $H_2$) and CO cleanup. The $H_2$ rich-fuel stream then enters the fuel cell (12) where it reacts electronically with air (not shown) to produce electricity, waste heat and an exhaust stream containing vaporized water. A hydrogen-oxygen fuel cell as used herein includes fuel cells in which the hydrogen-rich fuel is hydrogen or hydrogen containing gases and the oxygen may be obtained from air. This stream is passed through a condenser (13) to recover a portion of the water vapor, which is recycled to the water reservoir (6) via stream (14). The partially dried exhaust stream (15) is released to the atmosphere. Components 3 (reformer) and 11 (water gas shift reactor) comprise a generalized fuel processor.

Figure 2:
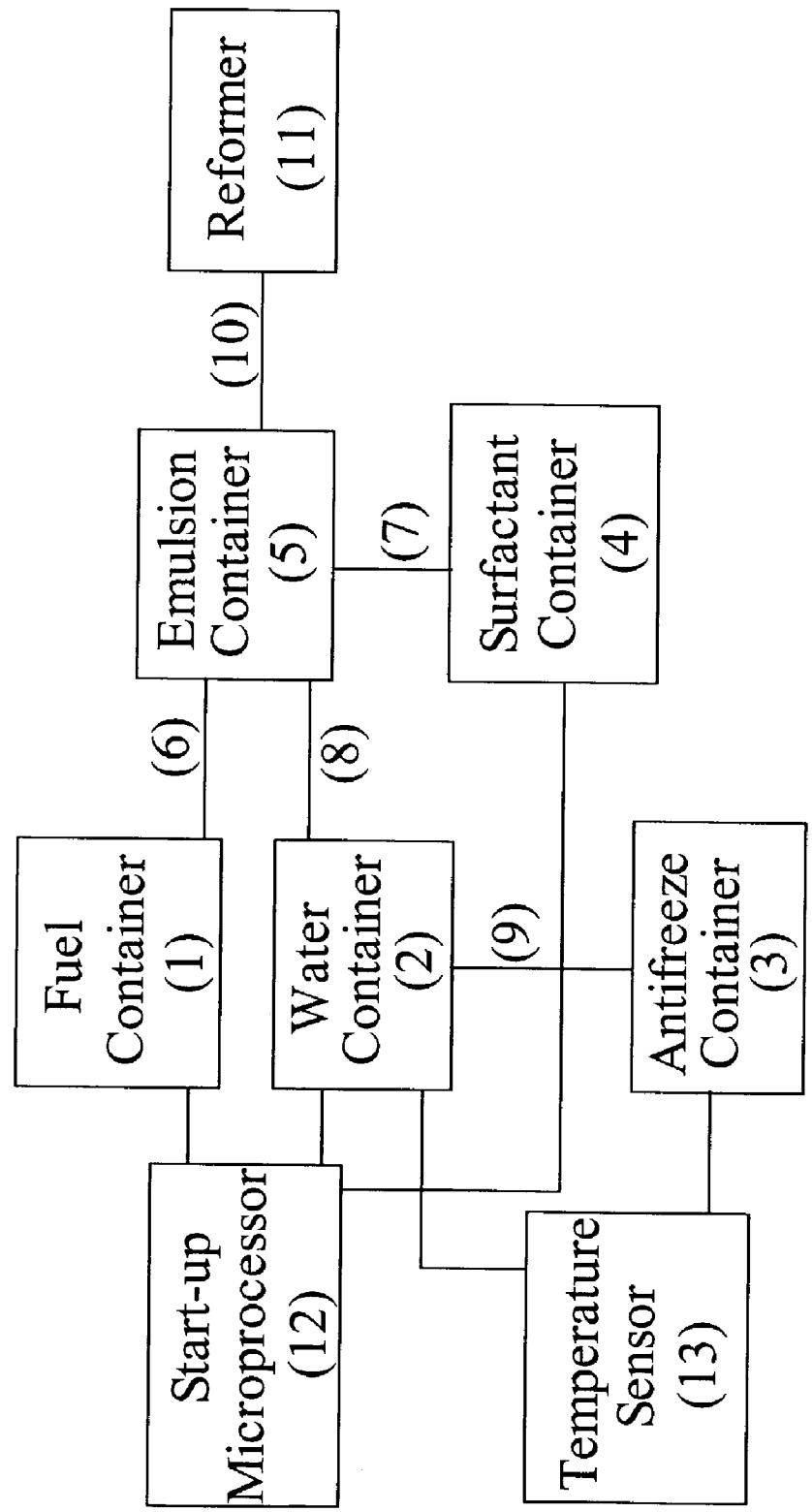
FIG. 2 shows a schematic diagram of an improved fuel cell system wherein a start-up system is operably connected to a reformer.

FIG. 2 is comprised as follows: fuel is stored in a fuel container (1), water in a water container (2), antifreeze in an antifreeze container (3), surfactant in a surfactant container (4), and emulsion is made in an emulsion container (5). The fuel and surfactant containers (1) and (4) are connected to the emulsion container (5) via separate transfer lines (6) and (7) respectively. The water container (2) is connected to the emulsion container (5) via a transfer line (8) to dispense water or water-alcohol mixture to the emulsion container. The water container is further connected to an antifreeze container (3) via a transfer line (9). The emulsion container is fitted with a mixer. An outlet line (10) from the emulsion container (5) is connected to the fuel cell reformer of a conventional system such as a reformer (3) shown in FIG. 1; (reformer (3) of FIG. 1 is equivalent to reformer (11) shown in FIG. 2). The fuel, water and surfactant containers are all individually connected to a start-up microprocessor (12) whose signal initiates the dispensing of the fuel, water and surfactant into the emulsion container. The water container is connected to a temperature sensor (13), which senses the temperature of the water in the water container. The temperature sensor is connected to a battery (not shown) and the antifreeze container. The temperature sensor triggers the heating of the water container or dispensing of the antifreeze as desired. The configuration for the fuel cell start-up described above is one non-limiting example of a start-up system. Other configurations can also be employed.

In an alternate embodiment of the start-up system the water container is the water storage chamber of the conventional fuel cell system. In another embodiment of the start-up system the emulsion container is eliminated. Fuel, water and surfactant are dispensed directly into the transfer line (10) shown in FIG. 2. In this embodiment the transfer line (10) is fitted with in-line mixers. A typical in-line mixer is comprised of a tubular container fitted with in-line mixing devices known in the art. One non-limiting example of an in-line mixing device is a series of fins attached perpendicular to the fluid flow. Another example is a series of restricted orifices through which fluid is propagated. In-line mixers are known to those skilled in the art of mixing fluids. The placement of the number and angle of the fins to the circumference of the tube is known to those skilled in the art of in-line mixer design. A sonicator can also be used as an in-line mixing device. The sonicator device for in-line mixing comprises a single sonicator horn or a plurality of sonicator horns placed along the transfer line (10).

A mixture comprising fuel and surfactant can be simultaneously injected with water into the front portion of the in-line mixer. Alternately, a mixture comprising water and surfactant can be simultaneously injected with fuel into the front portion of the in-line mixer. The fuel, water and surfactant are mixed as they flow through the in-line mixer to form an emulsion. The end portion of the in-line mixer delivers the emulsion to the reformer through an injection nozzle.

One function of the improved fuel cell system is that at start-up, the fuel and water are delivered as an emulsion to the reformer. One advantage to using an emulsion at start-up is that a well-mixed water/fuel injection is achieved. This can improve the efficiency of start-up of the reformer. Another advantage of using an emulsion is that the fuel-water mixture can be sprayed into the reformer as opposed to introducing vapors of the individual components into the reformer. Delivery of the fuel and water as an emulsion spray has reformer performance advantages over delivery of the fuel and water in a vaporized state. Further spraying the emulsion has mechanical advantages over vaporizing the components and delivering the vapors to the reformer. Among the desirable features of emulsions suitable for use in the improved fuel cell start-up system described herein are: (a) the ability to form emulsions are low shear; (b) the ability of the surfactants to decompose at temperatures below 700° C.; (c) the viscosity of the emulsions being such that they are easily pumpable, and, (d) the emulsion viscosity decreases with decreasing temperature. The emulsions of the instant invention possess these and other desirable attributes.

The fluid dispensed from the emulsion container or the in-line mixer into the reformer is the emulsion composition of the instant invention suitable for start-up of a reformer of a fuel cell system. Once the reformer is started with the emulsion composition it can continue to be used for a time period until a switch is made to a hydrocarbon and steam composition. Typically a start-up time period can range from 0.5 minutes to 30 minutes depending upon the device the fuel cell system is the power source of. The emulsion composition of the instant invention comprises hydrocarbon, water and surfactant. In a preferred embodiment the emulsion further comprises low molecular weight alcohols. Another preferred embodiment of the emulsion composition is a bicontinuous emulsion comprising a coexisting mixture of at least 80 vol % of a water-in-hydrocarbon macro emulsion and from 1 to 20 vol % of a hydrocarbon-in-water micro emulsion.

A hydrocarbon-in-water emulsion is one where hydrocarbon droplets are dispersed in water. A water-in-hydrocarbon emulsion is one where water droplets are dispersed in hydrocarbon. Both types of emulsions require appropriate surfactants to form stable emulsions of the desired droplet size distribution. If the average droplet sizes of the dispersed phase are less than about 1 micron in size, the emulsions are generally termed micro-emulsions. If the average droplet sizes of the dispersed phase droplets are greater than about 1 micron in size, the emulsions are generally termed macro-emulsions. A hydrocarbon-in-water macro or micro emulsion has water as the continuous phase. A water-in-hydrocarbon macro or micro emulsion has hydrocarbon as the continuous phase. A bicontinuous emulsion is an emulsion composition wherein hydrocarbon-in-water and water-in-hydrocarbon emulsions coexist as a mixture. By "coexist as a mixture" is meant that the microstructure of the emulsion fluid is such that regions of hydrocarbon-in-water intermingle with regions of water-in-hydrocarbon. A bicontinuous emulsion exhibits regions of water continuity and regions of hydrocarbon continuity. A bicontinuous emulsion is by character a micro-heterogeneous biphasic fluid.

The hydrocarbon component of the emulsion composition of the instant invention is any hydrocarbon boiling in the range of 30° F. (−1.1° C.) to 500° F. (260° C.), preferably 50° F. (10° C.) to 380° F. (193° C.) with a sulfur content less than about 120 ppm and more preferably with a sulfur content less than 20 ppm and most preferably with a no sulfur. Hydrocarbons suitable for the emulsion can be obtained from crude oil refining processes known to the skilled artisan. Low sulfur gasoline, naphtha, diesel fuel, jet fuel, kerosene are non-limiting examples of hydrocarbons that can be utilized to prepare the emulsion of the instant invention. A Fisher-Tropsch derived paraffin fuel boiling in the range between 30° F. (−1.1° C.) and 700° F. (371° C.) and, more preferably, a naphtha comprising $C_5-C_{10}$ hydrocarbons can also be used.

The water component of the emulsion composition of the instant invention is water that is substantially free of salts of halides, sulfates and carbonates of Group I and Group II elements of the long form of The Periodic Table of Elements. Distilled and deionized water is suitable. Water generated from the operation of the fuel cell system is preferred. Water-alcohol mixtures can also be used. Low molecular weight alcohols selected from the group consisting of methanol, ethanol, normal and iso-propanol, normal, iso and secondary-butanol, ethylene glycol, propylene glycol, butylene glycol and mixtures thereof are preferred. The ratio of water:alcohol can vary from about 99.1:0.1 to about 20:80, preferably 90:10 to 70:30.

An essential component of the emulsion composition of the instant invention is at least one surfactant selected from the group consisting of alkyl sorbitan esters and alkoxylated alkyl sorbitan esters and mixtures thereof, having chemical structures respectively.

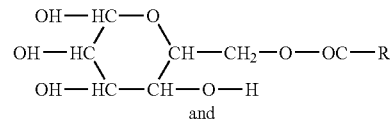
and

-continued

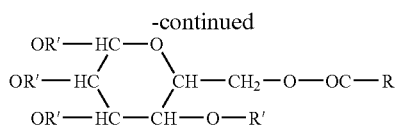

wherein R is an alkyl group of 5 to 18 carbons,
$R^{40}$ is H or $(M-O)_n-H$ where n is an integer from about 2 to 20 and the total number of $(M-O)_n-H$ groups per molecule is 2 to 60,
M is $CH_2-CH_2$, $CH_2-CH_2-CH_2$, $CH_2-CH-CH_3$, $CH_2-CH_2-CH_2-CH_2$, $CH_2-CH-(CH_3)-CH_2$ or mixtures thereof.

Preferably M is $CH_2-CH_2$. The term "alkyl" in the alkyl sorbitan ester and alkoxylated alkyl sorbitan ester surfactants is meant to represent saturated alkyl hydrocarbons, unsaturated alkyl hydrocarbons or mixtures thereof. The hydrocarbons can be linear or branched hydrocarbons. The preferred surfactants are thermally labile and decompose in the temperature range of 250° C. to 700° C. Preferably at about 700° C. substantially all of the surfactant is decomposed.

The total concentration of surfactants in the emulsion composition is in the range of 0.01 to 5 wt %. The preferred concentration is in the range of 0.05 to 1 wt %.

The ratio of hydrocarbon:water in the emulsion can vary from 40:60 to 60:40 based on the weight of the hydrocarbon and water. In terms of the ratio of water molecule:carbon atom in the emulsion, the ratio can be 0.25 to 3.0. A ratio of water molecule:carbon atom of 0.9 to 1.5 is preferred.

It is preferred to store the surfactant as a concentrate in the start-up system of the fuel cell reformer. The surfactant concentrate can comprise the said surfactant or mixtures of said surfactants and hydrocarbon. Alternately, the surfactant concentrate can comprise the said surfactant or mixtures of said surfactants and water. The amount of surfactant can vary in the range of about 80% surfactant to about 30 wt %, based on the weight of the hydrocarbon or water. Optionally, the surfactant concentrate can comprise the said surfactant or mixtures of said surfactants and a water-alcohol solvent. The amount of surfactants can vary in the range of about 80 wt % to about 30 wt %, based on the weight of the water-alcohol solvent. The ratio of water:alcohol in the solvent can vary from about 99:1 to about 1:99. The hydrocarbon, water and alcohol used for storage of the surfactant concentrate are preferably those that comprise the emulsion and described in the preceding paragraphs.

The surfactants of the instant invention when mixed with hydrocarbon and water at low shear form a bicontinuous emulsion. Low shear mixing can be mixing in the shear rate range of 1 to 50 $sec^{-1}$, or expressed in terms of mixing energy, in the mixing energy range of $0.15 \times 10^{-5}$ to $0.15 \times 10^{-3}$ kW/liter of fluid. Mixing energy can be calculated by one skilled in the art of mixing fluids. The power of the mixing source, the volume of fluid to be mixed and the time of mixing are some of the parameters used in the calculation of mixing energy. In-line mixers, low shear static mixers, low energy sonicators are some non-limiting examples for means to provide low shear mixing.

A method to prepare the emulsion of the instant invention comprises the steps of adding surfactant to the hydrocarbon phase, adding the said surfactant solution to water and mixing at a shear rate in the range of 1 to 50 $sec^{-1}$ ($0.15 \times 10^{-5}$ to $0.15 \times 10^{-3}$ kW/liter of fluid) for 1 second to 15 minutes to form the bicontinuous emulsion mixture. Optionally, the surfactant may be added to water and the solution added to hydrocarbon followed by mixing. Another method to prepare the emulsion comprises adding the water-soluble surfactant to the water phase, hydrocarbon-soluble surfactant to the hydrocarbon phase and then mixing the aqueous surfactant solution with the hydrocarbon surfactant solution. Yet another method comprises adding the surfactants to the hydrocarbon-water mixture followed by mixing.

In a preferred embodiment, the reformer of the fuel cell system is started with a bicontinuous emulsion comprising a coexisting mixture of at least 80 vol % of a water-in-hydrocarbon macro emulsion and from 1 to 20 vol % of a hydrocarbon-in-water micro emulsion. When a mixture of hydrocarbon, water or water-methanol mixtures and surfactants of the instant invention are subject to low shear mixing a bicontinuous emulsion comprising a mixture of at least 80 vol % of a water-in-hydrocarbon macro emulsion and from 1 to 20 vol % of a hydrocarbon-in-water micro emulsion is formed.

When alkyl sorbitan esters and alkoxylated alkyl sorbitan esters of the structures shown in structures 1 and 2 below are added to naphtha and distilled water and subject to low shear mixing bicontinuous emulsions are formed. Further, substitution of water with water/methanol mixture in the ratio of 80/20 to 60/40 does not alter the emulsifying performance of the surfactants or the nature of bicontinuous emulsion that is formed. A single surfactant selected from the group shown in structure 1 or 2 may be used. It is preferred to use a mixture of water-soluble and hydrocarbon soluble surfactants of the type shown in structures 1 and 2.

Structure 1: Alkyl Sorbitan Ester

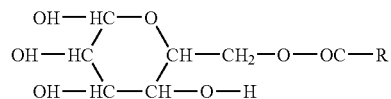

where R is an alkyl group of 5 to 18 carbons,

Structure 2: Alkoxylated Alkyl Sorbitan Esters

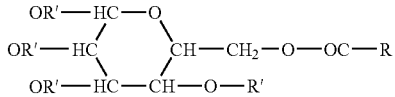

wherein R is an alkyl group of 5 to 18 carbons,
$R^{40}$ is H or $(M-O)_n-H$ where n is an integer from about 2 to 20 and the total number of $(M-O)_n-H$ groups per molecule is 2 to 60,
M is $CH_2-CH_2$, $CH_2-CH_2-CH_2$, $CH_2-CH-CH_3$, $CH_2-CH_2-CH_2-CH_2$, $CH_2-CH-(CH_3)-CH_2$ or mixtures thereof.

When a mixture of surfactants of the types shown in structures 1 and 2 is used, the ratio of structure 1 surfactant: structure 2 surfactant can vary in the range of 95:5 to 5:95 by weight.

In general, alkyl sugar esters and alkoxylated alkyl sugar esters can be used. The preferred surfactants are the alkyl sorbitan ester and alkoxylated alkyl sorbitan esters. Non-limiting examples of sugars related to sorbitan that can be used in place of sorbitan in the chemical structures shown in structure 1 and 2 are glucose, fructose, sucrose, maltose and related sugars.

In the operation of the fuel cell it is expected that the emulsion composition will be utilized at start-up of the reformer and extending for a time period when a switch to hydrocarbon and steam is made. One embodiment of the invention is the feeding to the reformer of a fuel cell system, first a composition comprising the emulsion composition of the instant invention, followed by a hydrocarbon/steam composition. The bicontinuous emulsion composition allows a smooth transition to the hydrocarbon/steam composition.

The emulsion compositions of the instant invention also exhibit detergency and anti-corrosion function to keep clean and clean up of the metal surfaces. The surfaces of the reformer catalyst and the internal components of the fuel cell system can be impacted by treatment with the emulsion. While not wising to be bound by the theory and mechanism of the keep clean and clean-up function one embodiment of the invention is a method for improving anti-corrosion of metal surfaces comprising treating the surface with an emulsion composition of the instant invention. The metal surface comprises metallic elements selected from The Periodic Table of Elements comprising Group III (a) to Group II (b) inclusive. The metal surface can further include metal oxides and metal alloys wherein said metal can be selected from The Periodic Table of Elements comprising Group III (a) to Group II (b) inclusive.

The following non-limiting examples illustrate the invention.

EXAMPLE 1

The effectiveness of the surfactants to form emulsions is expressed quantitatively by the reduction in interfacial tension between the hydrocarbon and water phases. Naphtha, a hydrocarbon mixture distilling in the boiling range of 50° F. to 400° F. or 10° C. to 204° C. was used as the hydrocarbon and double distilled deionized water as the aqueous phase. Interfacial tensions were determined by the pendant drop method known in the art. Greater than 96% reduction in interfacial tension was observed indicative of the propensity for spontaneous emulsification of the water and hydrocarbon phases by these surfactants. Table 1 provides comparative interfacial tension data.

TABLE 1

| Solution | Interfacial tension (dynes/cm) |
| --- | --- |
| Naphtha/Water | 53.02 |
| Naphtha/Water + 0.04 wt % alkyl sorbitan surfactant (structure 1, R = C18) + 0.06 wt % alkoxylated alkyl sorbitan surfactant (structure 2, R = C18; M is $CH_2$—$CH_2$; n = 20) | 1.4 |

Thermogravimetry experiments were conducted on representative surfactants shown in structure 1 (R=C18) and structure 2 (n=20; R=C18; M is $CH_2$—$CH_2$). It was observed that the surfactants decomposed in the temperature range of 250° C. to 700° C. Substantially all of the surfactants had decomposed at a temperature of about 400° C.

EXAMPLE 2

0.6 g of Tween 80 (Structure 2, R=C18; M is $CH_2$—$CH_2$, n=20) and 0.4 g of Span 80 (Structure 1, R=C 18) both sold by Uniequema ICI were added to a mixture of 50 g naphtha (dyed orange) and 50 g water (dyed blue) and mixed using a Fisher Hemetology/Chemistry Mixer Model 346. Mixing was conducted for 5 minutes at 25° C.

Conductivity measurements are ideally suited to determine the phase continuity of an emulsion. A water continuous emulsion will have conductivity typical of the water phase. A hydrocarbon continuous emulsion will have negligible conductivity. A bicontinuous emulsion will have a conductivity intermediate between that of water and hydrocarbon.

By using dyes to color the hydrocarbon and water, optical microscopy enables determination of the type of emulsions by direct observation. The third technique to characterize emulsions is by determination of viscosity versus shear rate profiles for the emulsion as a function of temperature.

Using a Leitz optical microscope the emulsion of Example 2 was characterized as a mixture of water-in-hydrocarbon macro type in coexistence with a hydrocarbon-in-water micro type. The water-in-hydrocarbon type emulsion was the larger volume fraction of the mixture.

A measured volume of the emulsion of Example 2 was poured into a graduated vessel and allowed to stand for about 72 hours. The co-existing bicontinuous emulsion mixture separated, after 72 hours of standing, into the constituent emulsion types. The hydrocarbon continuous type was the upper phase and the water continuous type the lower phase. The graduated vessel allowed quantitative determination of the volume fraction of each type of emulsion.

The conductivity of water was recorded as 47 micro mho; naphtha as 0.1 micro mho and the emulsion of Example 2 was 10 micro mho confirming the bicontinuous emulsion characteristics of the fluid.

Viscosity as a function of shear rate was determined for the emulsion of Example 2 at 25° C. and 50° C. A decrease in emulsion viscosity with decreasing temperature was observed. An emulsion exhibiting decreasing viscosity with decreasing temperature is unique and advantageous for low temperature operability of the reformer.

Further, the emulsion of Example 2 was stable for at least 12 hours at 25° C. in the absence of shear or mixing. In comparison, in a control experiment wherein the stabilizing surfactants were omitted and only the hydrocarbon and water were mixed, the resulting emulsion phase separated within 5 seconds upon ceasing of mixing. Yet another unexpected feature of the emulsions of the instant invention is that when the emulsions were cooled to −54° C. they solidified and when thawed or heated to +50° C. the emulsions liquefied and retained their stability and bicontinuous nature. This is in contrast to single-phase continuity emulsions that phase separate upon cooling and thawing.

Using stable bicontinuous emulsions comprised of hydrocarbon, water and suitable surfactants has reformer performance advantages and enhancements compared to using unstable emulsions of hydrocarbon and water in the absence of stabilizing surfactants as disclosed in U.S. Pat. No. 5,827,496. The stability, bicontinuous characteristic and the observed decrease in viscosity with decreasing temperature are at least three distinguishing features of the emulsion composition of the instant invention that can result in unexpected enhancement in reformer performance compared to conventional unstable emulsions with single-phase continuity and increasing viscosity with decreasing temperature.

EXAMPLE 3

A bicontinuous emulsion was prepared as recited in Example 2, with the difference that the blue and orange dyes were not used to dye the hydro-carbon and water phases. The emulsion of Example 3, naphtha and water were subject to the ASTM D130 Copper Corrosion Test. In this test, copper coupons are exposed to liquid samples for 3 hours each at 122° F. At the conclusion of the test the coupons are graded for corrosion on a scale defined as:

1A, 1B; 2A, 2B, 2C, 2D; 3A, 3B; 4A, 4B, 4C, where 1A represents the cleanest and 4C the most corroded situation. In the test, Naphtha was graded 1B
Water was graded 1B The emulsion composition was graded 1A. An anticorrosion performance was thus exhibited by the emulsion composition of the instant invention.

What is claimed is:

1. In a fuel cell system comprising a reformer to produce a hydrogen containing gas for use in a fuel cell stack, the improvement comprising:
    feeding to the reformer, during start-up, an emulsion comprising at least 40 wt % hydrocarbon, from 30 to 60 wt % water, and at least one surfactant, wherein the emulsion comprises a bicontinuous micro-heterogeneous emulsion composition comprising a coexisting mixture of:
    a. at least 80 vol % of a water-in-hydrocarbon macro emulsion having average droplet sizes of dispersed phase droplets greater than about one micron, and
    b. 1 to 20 vol % of a hydrocarbon-in-water micro emulsion having average droplet sizes of dispersed phase droplets less than about one micron, and
    c. from 0.01 to 5 wt % of at least one surfactant selected from the group consisting of alkyl sorbitan esters and alkoxylated alkyl sorbitan esters and mixtures thereof, and represented by the respective formulae

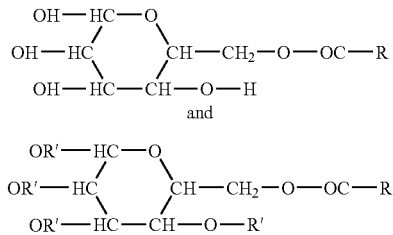

and wherein R is an alkyl group of 5 to 18 carbons,
R' is H or $(M-O)_n-H$ where n is an integer from about 2 to 20 and the total number of $(M-O)_n-H$ groups per molecule is from 2 to 60, M is $CH_2-CH_2$, $CH_2-CH_2-CH_2$, $CH_2-CH-CH_3$, $CH_2-CH_2-CH_2-CH_2$, $CH_2-CH-(CH_3)-CH_2$ or mixtures thereof.

2. The improvement of claim 1 wherein the emulsion further comprises up to 20 wt % alcohol based on the total weight of the said emulsion wherein said alcohol is selected form the group consisting of methanol, ethanol, n-propanol, iso-propanol, n-butanol, sec-butyl alcohol, tertiary butyl alcohol, n-pentanol, ethylene glycol, propylene glycol, butyleneglycol and mixtures thereof.

3. The improvement of claim 1 wherein said hydrocarbon is in the boiling range of −1° C. to 260° C.

4. The improvement of claim 1 wherein said water is substantially free of salts of halides, sulfates and carbonates of Group I and Group II elements of the long form of The Periodic Table of Elements.

5. The improvement of claim 1 wherein the surfactant thermally decomposes at temperatures in the range of about 250° C. to 700° C.

6. The improvement of claim 1 wherein in said surfactant M is $CH_2-CH_2$.

* * * * *